July 2, 1968 — G. KOPP — 3,391,047
APPARATUS FOR MANUFACTURING DUAL-COMPARTMENT SACHETS
Filed Dec. 12, 1966
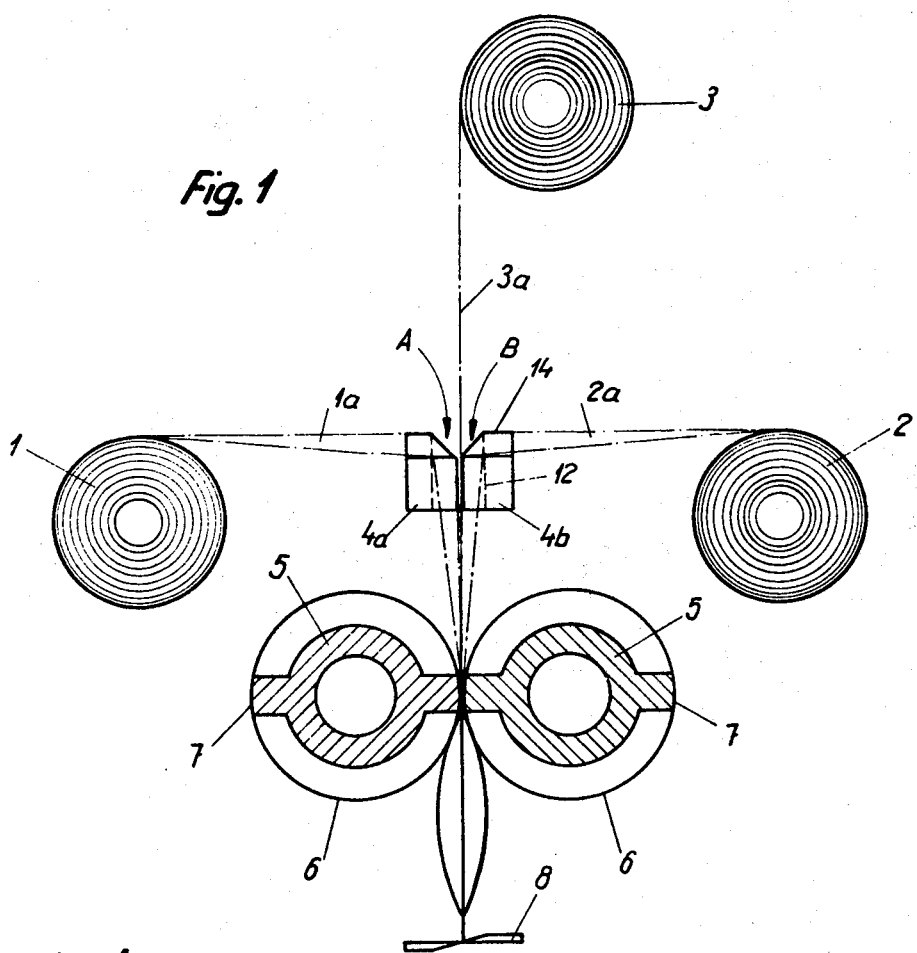
Fig. 1
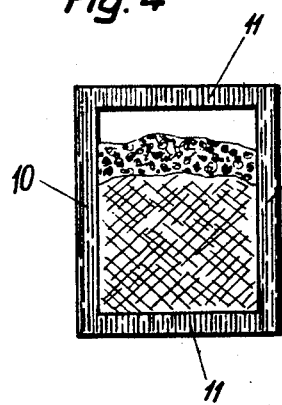
Fig. 4
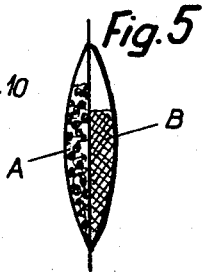
Fig. 5
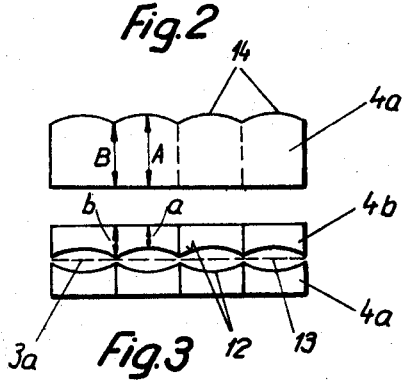
Fig. 2
Fig. 3

United States Patent Office 3,391,047
Patented July 2, 1968

3,391,047
APPARATUS FOR MANUFACTURING DUAL-COMPARTMENT SACHETS
Georg Kopp, Neuhausen am Rheinfall, Switzerland, assignor to Schweizerische Industrie-Gesellschaft, Neuhausen am Rheinfall, Switzerland
Filed Dec. 12, 1966, Ser. No. 601,132
Claims priority, application Switzerland, Dec. 13, 1965, 17,185/65
2 Claims. (Cl. 156—553)

ABSTRACT OF THE DISCLOSURE

Apparatus for continuously manufacturing dual-compartment sachets by welding together three lengths of weldable material. A pair of juxtaposed curved guides engage the two outer lengths by respective facing side walls whilst the central third length passes freely between the guides. The side walls have concave surfaces for imparting curved configurations to said outer lengths whereby to define open sachet mouths.

Summary of the invention

An object of the invention is to provide a device which renders possible the economic manufacture of dual-compartment sachets whose compartments serve to contain two different materials which are to be mixed together only immediately before use, e.g., the two constituents of a hardenable adhesive.

According to the present invention apparatus for manufacturing dual-compartment sachets comprises welding means and a pair of guides arranged for receiving three lengths of weldable material from respective supply rolls for deflecting the outside ones of the three lengths by a corresponding one of the guides whilst the inner strip passing between the pair of guides is undeflected, facing side walls of the guides having concave guide surfaces thereon and top faces of the guides having convex guide surfaces thereon at an angle to the side walls such that all points on the lengths sliding across these guide surfaces travel along paths of equal length.

The invention will be further described, by way of example, with reference to the accompanying drawings, in which:

FIG. 1 is an end view of one embodiment of apparatus for manufacturing dual-compartment sachets,
FIG. 2 is a side view of one guide of the apparatus,
FIG. 3 is a plan view of the pair of guides of the apparatus,
FIG. 4 is a side view of a filled dual-compartment sachet manufactured by the embodiment of apparatus of FIG. 1, and
FIG. 5 is a longitudinal section through the dual-compartment sachet of FIG. 4.

As illustrated in FIG. 1, continuous lengths $1a$, $2a$, $3a$ of weldable material are fed to a pair of guides $4a$, $4b$ from three supply rolls 1, 2, 3. The lengths $1a$, $2a$ run substantially horizontally to the guides $4a$, $4b$ and are deflected downwards by about 90° by the guides. The centre length $3a$ passes between the guides without being deflected thereby. The three lengths thereupon pass between two heated welding jaws 5 constructed as driven rollers, rotation of which effects the advance of the lengths of material. The roller-shaped welding clamps have circumferential ribs 6 and two longitudinal ribs 7 offset by 180°. The circumferential ribs serve to form the longitudinal welded seams 10 of the sachet, and the longitudinal ribs 7 serve to form the transverse seams 11 (see FIG. 4). The sachets, still attached to each other, are separated from each other by a severing device 8 disposed after the welding jaws. The apparatus is generally constructed for the simultaneous formation of a plurality of sachets side by side.

A pair of guides $4a$, $4b$ for the simultaneous formation of four sachets is illustrated in FIGS. 2 and 3 by way of example. In this case, five circumferential ribs 6 are provided on the welding jaws 5, and a longitudinal severing device (not shown) having three blades for the longitudinal seams is provided in front of the transverse severing device 8.

When a transverse seam 11 and the greater portion of the longitudinal seams 10 of a sachet or a row of sachets have been formed, the two compartments of the sachet are each filled with respective materials A and B. By way of example, the filling operation is effected by two hollow tubes (not illustrated) which are inserted between the two guides, as indicated by the arrows A and B in FIG. 1, for injecting a measured quantity of material A or B into the compartments of the sachets still open at the top. During the filling operation the hollow tubes may be arranged to extend through the welding jaws 6 and into the partially formed sachet or sachets. When the sachets are almost full, the hollow tubes are withdrawn beyond the welding jaws, the flow of material is stopped and the sachets are sealed by making the next transverse seam 10.

Alternatively the hollow tubes need not extend through the welding jaws but may direct streams of material into the partially formed sachets.

The supply of material must cease before the sachet overflows.

The two guides $4a$, $4b$ have a special shape, so that a mouth, through which the hollow tubes may be inserted, remains open on each side of the central length $3a$. The side walls of the guides facing each other have concave guide surfaces 12, so that cavities 13 partitioned off by the strip $3a$ are formed between the guides. Convex guide surfaces 14 are arranged on the upper faces of the guides $4a$, $4b$, so that the lengths $1a$, $2a$ passing through are drawn against the surfaces 12. The prominences or depressions must thereby be dimensioned so that the distances $A+a$ and $B+b$ are equal (see FIGS. 2 and 3). In this manner, all the points of the lengths $1a$, $2a$ sliding over the guide surfaces 14 and 12 travel along paths of equal length. Thus, the outer lengths of material cannot lift from the guide surfaces.

I claim:
1. In apparatus for manufacturing dual-compartment sachets, the combination comprising
   supply means for supplying three lengths of weldable material in sheet form,
   welding means for welding said three lengths of sheet material together along a seam which defines two compartments between said sheets of material,
   two spaced apart fixed guides for guiding respective ones of two outer ones of said three lengths from said supply means to said welding means whilst a central third one of said lengths passes freely between said guides,
   juxtaposed concave walls on said guides for imparting a curved configuration to said outer lengths whereby to define open mouths to said sachet compartments prior to the sealing thereof,
and respective convex top surfaces on said guides for leading said outer lengths on to said concave walls, each of said convex top surfaces being at an angle to its respective concave side wall and being so curved that all points on said outer lengths guided by said guides travel along paths of equal length.

2. Apparatus according to claim 1 in which said welding means comprises a pair of welding jaws, each of said jaws comprising a rotatable roller having thereon at least two spaced apart circumferential ribs for forming side seams to the sachet and at least one axially extending rib for forming end closure seams to the sachet.

References Cited
UNITED STATES PATENTS

| | | | |
|---|---|---|---|
| 2,374,504 | 4/1945 | Salfisberg | 156—582 |
| 3,068,933 | 12/1962 | Klar | 156—582 |
| 3,074,214 | 1/1963 | Schneider et al. | 53—180 |

DOUGLAS J. DRUMMOND, *Primary Examiner.*